July 1, 1958 R. L. BUCKELEW 2,840,914

LAYOUT DEVICE

Filed July 27, 1956

Raymond L. Buckelew
INVENTOR.

BY Clarence A. O'Brien
and Harvey B. Jacobson
Attorneys

United States Patent Office 2,840,914

Patented July 1, 1958

2,840,914

LAYOUT DEVICE

Raymond L. Buckelew, Grand Junction, Colo.

Application July 27, 1956, Serial No. 600,491

1 Claim. (Cl. 33—75)

The present invention relates to new and useful improvements in layout devices for use particularly by carpenters when laying out the centers for building studdings, for example, and has for its primary object to provide, in a manner as hereinafter set forth, novel means whereby any desired number of such centers may be expeditiously and accurately marked off.

Another very important object of the invention is to provide a layout device or instrument of the aforementioned character comprising means whereby centers of various lengths may be rapidly and uniformly marked off.

Other objects of the invention are to provide a layout device or instrument of the character described which will be comparatively simple in construction, strong, durable, compact, of light weight, highly efficient and reliable in use and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figures 1, 2:
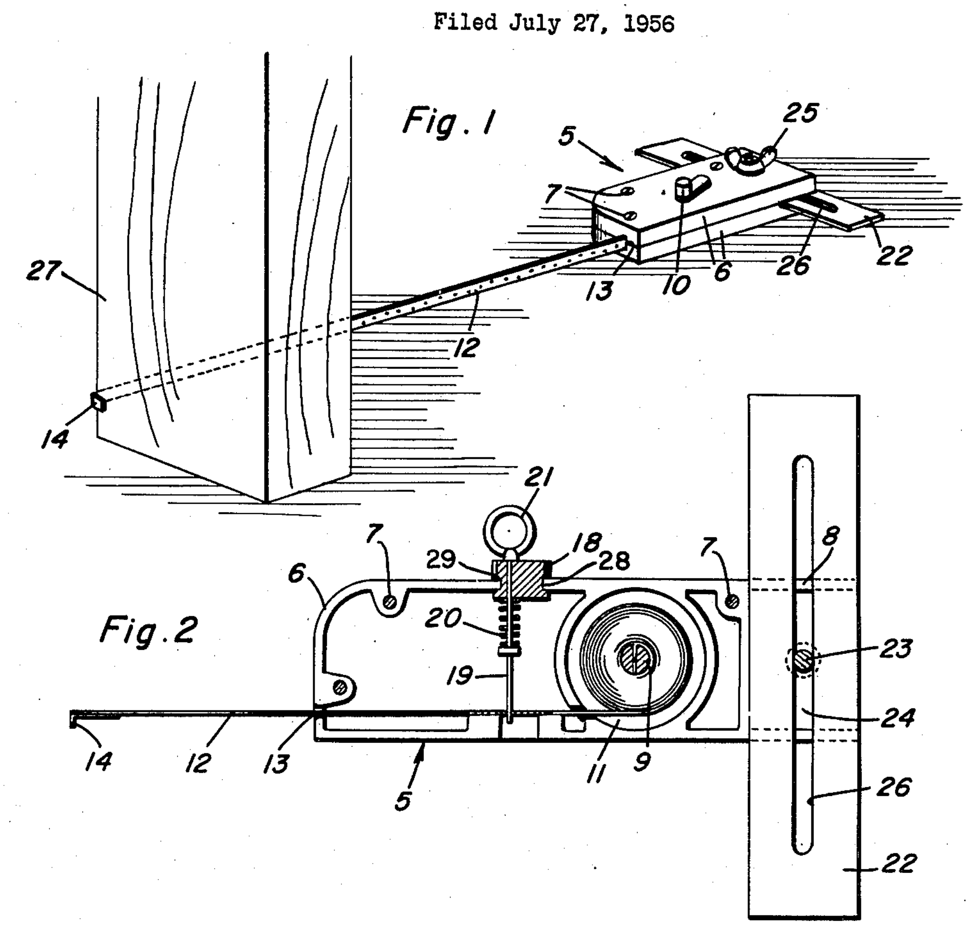
Figure 1 is a perspective view showing a layout device constructed in accordance with the present invention in use.
Figure 2 is a view in horizontal section through the device, taken substantially on the line 2—2 of Figure 3.
Figure 3:
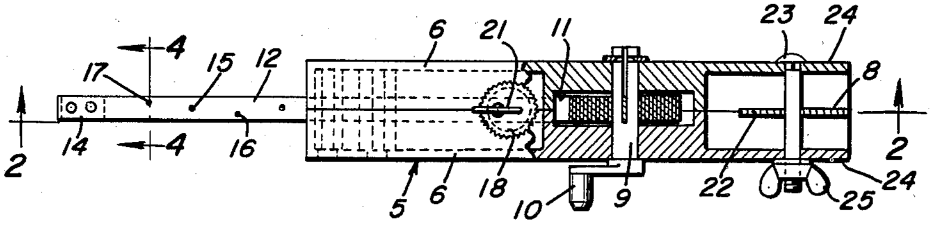
Figure 3 is a view partially in side elevation and partially in longitudinal section; and, Figure 4 is a view in transverse section, taken substantially on the line 4—4 of Figure 3.
Figure 4:
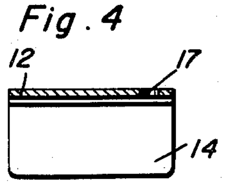

Referring now to the drawing in detail, it will be seen that the embodiment of the invention which has been illustrated comprises a substantially flat, elongated housing of suitable material which is designated generally by reference character 5. The housing 5, which may also be of any desired dimensions, comprises, in the embodiment shown, complemental half-sections 6 detachably secured together by countersunk screws 7. The housing 5 is of substantially the shape shown to advantage in Figure 2 of the drawing and said housing includes in its forward end portion a horizontal kerf or slot 8 the purpose of which will be presently set forth.

Journaled in the housing 5 at an intermediate point is a vertical slotted shaft 9 having an operating crank 10 on one end. Mounted on the shaft 9 in the housing 5 is a reel 11. A tape 12 of suitable material extends into the housing 5 and has one end secured to the reel 11 for winding thereon. The tape 12 is slidable through an opening 13 provided therefor in the rear end of the housing 5. On its other or free end, the tape 12 is provided with an anchoring hook 14. The tape 12 is further provided, in its central and longitudinal marginal portions, with intermediate and outer rows of perforations 15, 16 and 17. Any desired number of the rows of perforations may be provided. Also, the perforations comprising the rows may be spaced as desired.

Mounted for rotary adjustment in a circular opening 28 provided therefor in the housing 5 is a disk 18. A peripheral groove 29 in the disk 18 rotatably receives the housing 5. A pin 19 is slidably mounted off center in the disk 18 for engagement in the perforations 15, 16 or 17. A coil spring 20 in the housing 5 projects the pin 19. A finger ring 21 is provided on the outer end of the pin 19 for retracting same.

Mounted for pivotal and sliding adjustment in the kerf 8 of the housing 5 is a straight edge 22. A bolt 23 is mounted in the furcations 24 defined by the kerf 8 for frictionally clamping the straight edge 22 in adjusted position. A wing nut 25 is threaded on the bolt 23. A longitudinal slot 26 in the straight edge 22 accommodates the bolt 23.

It is thought that the use of the device will be readily apparent from a consideration of the foregoing. Briefly, in Figure 1 of the drawing, reference character 27 designates a studding located at the starting point of the layout. The hook 14 is engaged with the studding 27 for anchoring the tape 12 thereto. With the rotary disk 18 adjusted as desired, the housing 6 is slid over the work away from the studding 27, the tape 12 paying out from the reel 11. In the drawing, the disk 18 is in position for the pin 19 to enter the intermediate row of perforations 15. As the tape 12 is played out the pin 19, under the influence of the coil spring 20, enters the first perforation 15 for arresting the housing 5. The first center line is then marked off against the straight edge 22. The pin 19 is then manually disengaged from the tape 12 for permitting the housing 5 to again be moved forwardly. The pin 19, riding on the tape 12, enters the next perforation 15 for again arresting the housing 5 and the second center line is marked off against the straight edge 22. This procedure is repeated until the desired number of centers have been marked off. By loosening the wing nut 25, the straight edge 22 may be rotatably and slidably adjusted on the housing 5. By rotatably adjusting the disk 18, the pin 19 may be positioned to enter any of the desired rows of perforations 15, 16 or 17.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A layout device of the character described comprising: an elongated housing having a circular opening therein, a straight edge mounted on one end portion of said housing, a reel rotatably mounted in said housing, means for actuating said reel, a tape extending slidably into the housing and having one end secured to the reel for winding thereon, a hook on the other end of the tape for anchoring same to a support, said tape having a plurality of rows of longitudinally spaced perforations therein, a disk mounted for rotary adjustment in the opening and having therein a peripheral groove rotatably receiving the housing, and a spring projected, manually retracted bolt slidably mounted off center in the disk and engageable selectively in the rows of perforations for releasably locking the tape against sliding movement in the housing.

References Cited in the file of this patent

UNITED STATES PATENTS

| | | |
|---|---|---|
| 652,814 | Setzer | Jan. 3, 1900 |
| 2,582,405 | Auchard | Jan. 15, 1952 |
| 2,649,787 | Kobayashi | Aug. 25, 1953 |
| 2,738,586 | Sasse | Mar. 20, 1956 |